United States Patent
Tanaka

(10) Patent No.: US 6,971,665 B2
(45) Date of Patent: Dec. 6, 2005

(54) HEAD PROTECTIVE AIRBAG AND DEVICE

(75) Inventor: Tadashi Tanaka, Asaka (JP)

(73) Assignee: Takata Corporation, Tokyo (JP)

( * ) Notice: Subject to any disclaimer, the term of this patent is extended or adjusted under 35 U.S.C. 154(b) by 131 days.

(21) Appl. No.: 10/387,868

(22) Filed: Mar. 14, 2003

(65) Prior Publication Data
US 2003/0222437 A1 Dec. 4, 2003

(30) Foreign Application Priority Data
Mar. 19, 2002 (JP) .............. 2002-076617

(51) Int. Cl.$^7$ .............. B60R 21/22; B60R 21/24
(52) U.S. Cl. .............. 280/729; 280/730.2
(58) Field of Search .............. 280/729, 730.2, 280/743.1, 743.2, 730.1, 749

(56) References Cited

U.S. PATENT DOCUMENTS

| | | | |
|---|---|---|---|
| 6,409,211 B1 * | 6/2002 | Sheng et al. .............. | 208/730.2 |
| 6,450,527 B2 | 9/2002 | Kobayashi et al. | |
| 6,527,296 B2 * | 3/2003 | Bakhsh et al. .............. | 280/730.2 |
| 6,659,502 B2 * | 12/2003 | Breyvogel et al. .............. | 208/730.2 |
| 2002/0014762 A1 * | 2/2002 | Bakhsh et al. .............. | 280/730.2 |
| 2002/0020991 A1 | 2/2002 | Tanase et al. | |
| 2004/0026907 A1 * | 2/2004 | Takahara .............. | 280/730.2 |

FOREIGN PATENT DOCUMENTS

| | | |
|---|---|---|
| DE | 101 19 198 A1 | 11/2001 |
| EP | 1 182 099 A1 | 2/2002 |
| JP | 10-291457 A | 11/1998 |
| JP | 2000-296751 A | 10/2000 |
| JP | 2001-106014 A | 4/2001 |
| JP | 2001-163158 A | 6/2001 |
| JP | 2001-163161 A | 6/2001 |
| JP | 2001-180423 A | 7/2001 |
| JP | 2001-233155 A | 8/2001 |
| JP | 2001-260796 A | 9/2001 |

* cited by examiner

Primary Examiner—Peter C. English
(74) Attorney, Agent, or Firm—Foley & Lardner LLP

(57) ABSTRACT

A head protective airbag which is adapted to not be inflated or to be scarcely inflated when dragged out of a pillar cover is provided. The airbag can be extremely smoothly pulled or dragged out of the pillar cover. The head protective airbag is provided with a triangular first cell in a front portion of the airbag. The first cell is in communication with a gas inlet through first and second gas passages. As an inflator is actuated, gas flows first mainly into the first gas passage through the gas inlet so that the airbag pushes and opens a roof trim above a B-pillar and thus starts to deploy into a vehicle cabin. The first cell is pulled by the first gas passage and an area around the first gas passage so as to tear a trim of an A-pillar and come out of the trim. After that, the first cell is inflated.

17 Claims, 6 Drawing Sheets

HEAD PROTECTIVE AIRBAG AND DEVICE

BACKGROUND

The present invention relates to a protective airbag for protection of a vehicle occupant's head and, more particularly, to an airbag which is to be inflated to expand over windows of side doors in the event of a lateral collision or roll-over of a vehicle.

Airbag for protection of a vehicle occupant's head is disposed along a corner formed by a roof and a side portion of a vehicle cabin in the normal state and is adapted to be inflated with gas introduced through gas inlets to expand over windows of side doors.

Most of such head protective airbags are of a type which is disposed from an A-pillar along a roof side rail. Among the head protective airbags, there is a type not to allow the inflation of a portion along the A-pillar and a type to allow the inflation of a portion along the A-pillar. The present invention relates to a head protective airbag of a type to allow a portion along the A-pillar to be inflated just like the latter type and to a head protective airbag device with the head protective airbag.

FIGS. 6A–6C and FIG. 7 show the structure of a conventional head protective airbag (Japanese Unexamined Patent Publication No. H10-291457, incorporated by reference herein) which is adapted to allow a portion along the A-pillar to be inflated. FIG. 6(A) is a perspective view showing the airbag in a state of being inflated by introduction of gas, and FIGS. 6B and 6C are sectional views taken along a line B—B and a line C—C of FIG. 6(A), respectively. FIG. 7 is an illustration showing the airbag in a state of being inflated within a vehicle cabin.

The airbag 41 comprises two sheets 42, 43 which are superposed on each other and joined together along their peripheral edges to form chambers (cells) 51–59 extending vertically.

The upper portions of the chambers 51–59 are in fluid communication with an upper chamber 60 extending along the upper edge of the airbag 41. Formed in the sheet 42 is an opening 60a for allowing gas to be supplied into the upper chamber 60. Portions between adjacent chambers 51–59 are defined as webs 61–68 into which no gas is permitted to be introduced.

The airbag 41 is folded by pulling the lower edge thereof up and is disposed along about a roof side rail i.e. a corner formed by a roof 71 and a side portion of a vehicle 70, an A-pillar 78, and a C-pillar 79. The airbag 41 is covered by a suitable cover such as a pillar trim and a roof trim (not shown).

The airbag 41 having the aforementioned structure acts as follows. When the vehicle 70 is involved in a lateral collision or roll-over, gas is supplied into the upper chamber 60 through the opening 60a. The gas inflates the upper chamber 60 and the vertical chambers 51–59, whereby the airbag 41 pushes and opens the aforementioned cover and expands over the windows of side doors. The airbag 41 lies between the occupant's head and the side portion of the vehicle, thereby protecting the occupant's head. When the window is opened, the occupant's body is protected from being thrown out of the vehicle by the airbag.

In a conventional head protective airbag which is adapted to allow the inflation of a portion along a pillar, the airbag starts to be inflated within the cover and pushes and opens the cover, whereby the airbag deploys into the vehicle cabin. Therefore, the cover must have a large enough opening to allow the deployment of the already expanding airbag.

SUMMARY

It is an object of the present invention to provide a head protective airbag which is adapted to allow the inflation of a portion along a pillar, but not to allow or scarcely allow the inflation before it is pulled or dragged out of a pillar cover, whereby the portion can be extremely smoothly dragged out of the pillar cover and to provide a head protective airbag device provided with the airbag.

A head protective airbag of the present invention is a head protective airbag to be disposed to extend along at least one pillar and a roof side rail, comprising one or more first cell extending along the pillar, and one or more second cell extending along the roof side rail, wherein a passage for introducing gas into the first cell is connected to the first cell only at a portion opposite to the pillar side of the first cell.

In addition, a head protective airbag device of the present invention comprises the above head protective airbag and a gas supply means for supplying gas into the head protective airbag.

In the head protective airbag and airbag device, during gas is introduced into the airbag to inflate the airbag, the introduction of gas into the first cell extending along the pillar is conducted only through the gas passage connected to the portion opposite to the pillar side of the first cell. In this case, the gas passage is inflated with gas prior to the inflation of the first cell. Until the gas passage is inflated, the airbag pushes and opens a cover so as to start to deploy into a vehicle cabin. Therefore, the first cell is pulled by a portion including the inflated gas passage, whereby the first cell opens the pillar cover and is pulled out into the vehicle cabin before the first cell starts to be inflated or the cells are inflated a little. Since the first cell which is not or scarcely inflated is still small in volume, the first cell can be smoothly pulled out with little interference with the pillar cover. Then, the first cell coming out of the cover can be smoothly inflated with introduced gas without any restraint by the pillar cover.

The gas passage preferably includes a first gas passage extending substantially vertically from an upper portion to a lower portion of the head protective airbag, and a second gas passage extending along the lower side of the head protective airbag and connecting the first gas passage to the first cell.

According to an embodiment of the invention, after the first gas passage extending vertically is inflated to deploy downwardly, the second gas passage is inflated whereby the first cell is dragged out of the pillar cover.

In this case, it is preferable that the at least one second cell is disposed along the first gas passage. According to this head protective airbag, when the first gas passage of the airbag is inflated to deploy downwardly, the second cell is pulled downwardly by the inflated first gas passage. Therefore, the second cell can be smoothly inflated.

According to the present invention, it is preferable that the first cell is formed substantially in a triangular profile of which one side extends along the pillar and the gas passage is connected to a portion including an opposing corner of the one side of the triangular profile. Since the triangular first cell starts to come out of the pillar cover at an apex (the aforementioned corner) of the triangular profile, the resistance applied to the first cell by the pillar cover is extremely small.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
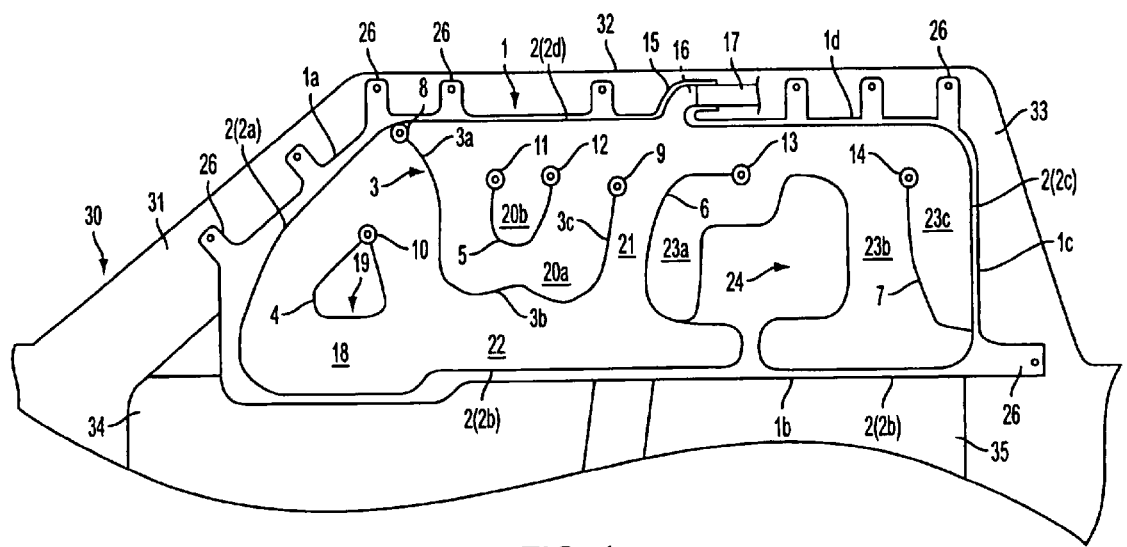
FIG. 1 is a front view, as seen from a vehicle cabin, showing a head protective airbag according an embodiment of the present invention.
Figure 2:
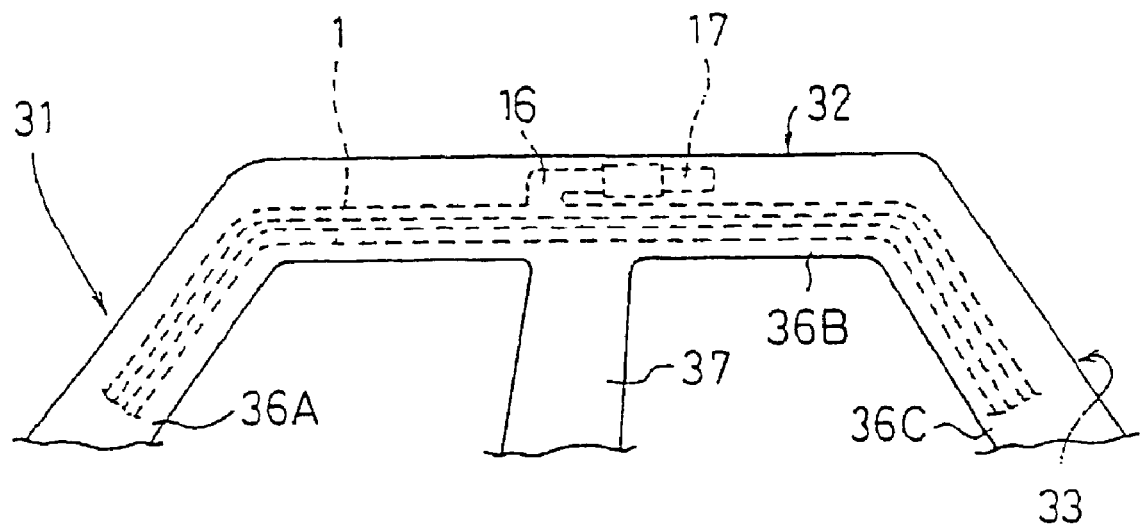
FIG. 2 is an illustration showing a deployment process of the head protective airbag.
Figure 3:
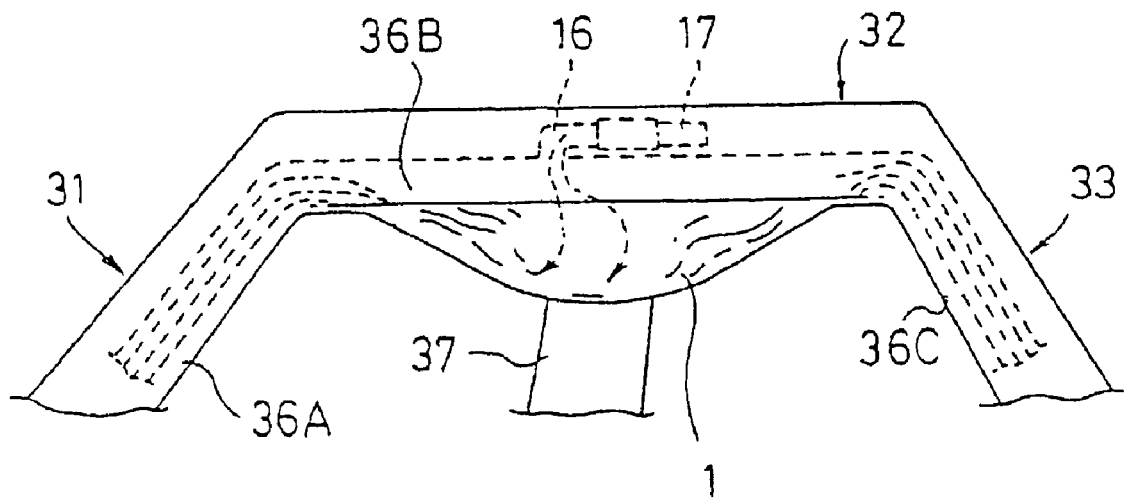
FIG. 3 is an illustration showing a deployment process of the head protective airbag.
Figure 4:
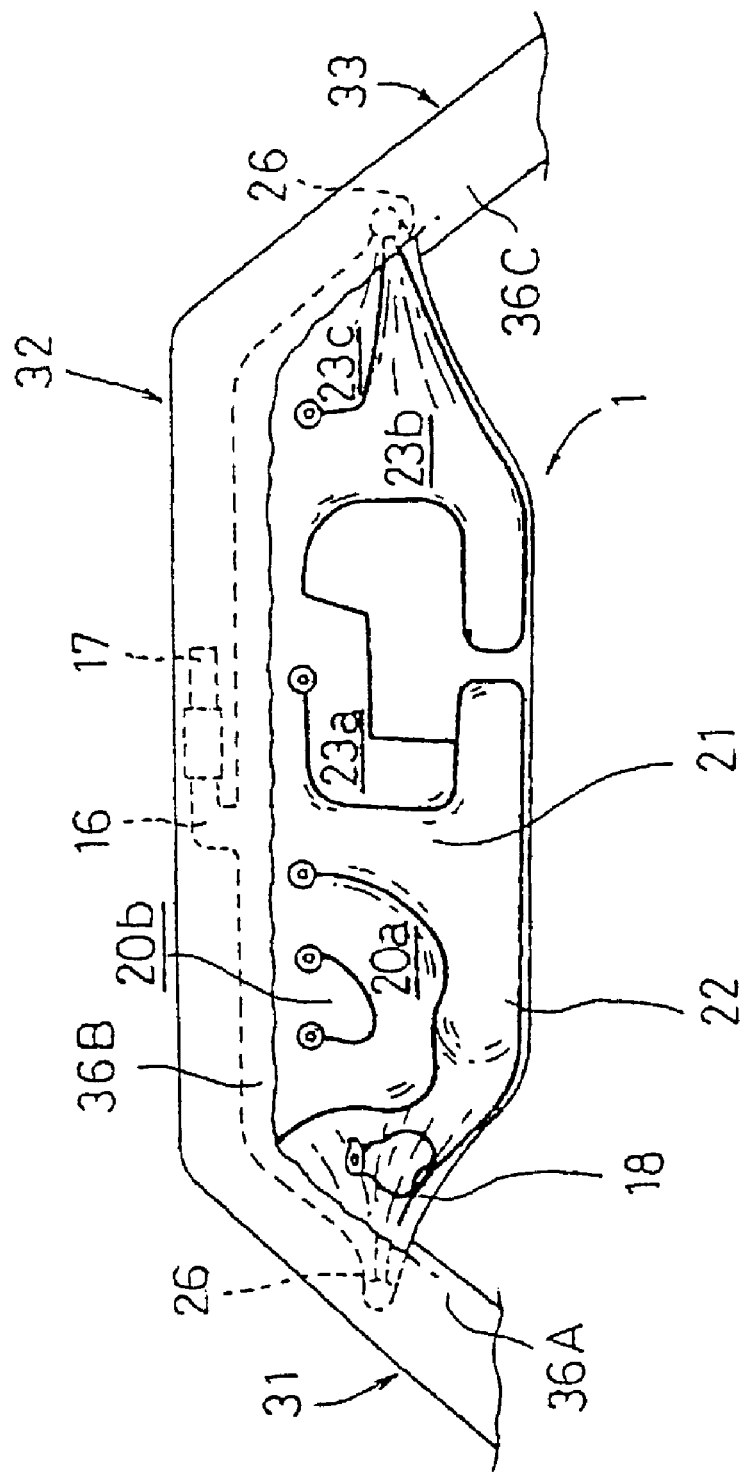
FIG. 4 is an illustration showing a deployment process of the head protective airbag.

Hereinafter, embodiments of the present invention will be described with reference to the attached drawings. FIG. 1 is a front view, as seen from a vehicle cabin, showing a head protective airbag according an embodiment of the present invention and FIGS. 2–4 are illustrations showing deployment processes of the head protective airbag. In the following description, the longitudinal direction is the longitudinal (back-and-forth) direction of a vehicle to which the head protective airbag is installed.

A head protective airbag (hereinafter, sometimes simply called "airbag") 1 of this embodiment is folded and disposed to extend from an A-pillar 31 to a C-pillar 33 through a roof side rail 32 of a vehicle 30. The airbag 1 has substantially a trapezoidal profile in the deployment state so that it is inflated into a curtain shape to extend along a side surface of the vehicle cabin from the roof side rail 32 and the respective pillars 31, 33 to the vicinity of the upper edges of front and rear door panels 34, 35 so as to cover over the upper half of a side face of the vehicle cabin in the event of a lateral collision or roll-over of a vehicle.

That is, the airbag 1 has a front side 1a to be extending along the A-pillar 31, a lower side 1b to be extending along the upper edges of the door panels 34, 35, a rear side 1c to be extending along the C-pillar 33, and an upper side 1d to be extending along the roof side rail 32 wherein the lower side 1b is longer than the upper edge 1d so that the airbag 1 substantially has a trapezoidal profile.

The airbag 1 comprises two sheets which are joined to each other by joints including a line-shaped joint 2 extending around their peripheries (with some parts thereof extending inward of the sheets), line-shaped joints 3–7 extending inside the peripheries, and circular joints 8–14 for reinforcing areas around ends of the line-shaped joints 3–7. The airbag 1 is designed to be inflated by introduction of gas into spaces between the sheets. It should be noted that the line-shaped joints 2–7 and the circular joints 8–14 may be formed by any of various joining means such as sewing, bonding, and welding.

The airbag 1 has an L-shaped projection 15 extending from a middle portion in the longitudinal direction of the upper side 1d thereof. Formed in the projection 15 is a gas inlet 16 for introducing gas into the airbag 1. A gas generator (inflator) 17 is connected to the gas inlet 16 for inflating the airbag 1. In an alternative embodiment, the projection 15 may be a separate piece from the airbag 1.

The line-shaped joint 2 comprises a front part 2a extending along the front side 1a, a lower part 2b extending along the lower side 1b, a rear part 2c extending along the rear side 1c, and an upper part 2d extending along the upper side 1d of the airbag 1.

The line-shaped joint 3 extends to communicate with a circular joint 8 which is disposed near a corner formed by the front side 1a and the upper side 1d of the airbag 1. The circular joint 8 is positioned to border on or quite close to the line-shaped joint 2 at the corner.

The line-shaped joint 3 is formed in a U-like shape comprising a front part 3a extending diagonally from the circular joint 8 to the lower back of the airbag 1, a middle part 3b as a continuation of the front part 3a and extending substantially in the longitudinal direction at about the middle in the vertical direction of the airbag 1, and a rear part 3c extending from the middle part 3b toward a middle portion in the longitudinal direction of the upper side 1d of the airbag and connected to a circular joint 9.

The middle part 3b of the line-shaped joint 3 is spaced apart from the line-shaped joint 2 extending along the lower side 1b of the airbag, thereby forming a second gas passage 22 between the line-shaped joint 2 and the middle part 3b of the line-shaped joint 3. The second gas passage 22 extends in the longitudinal direction along the lower part 2b of the line-shaped joint 2 in a lower portion of the airbag 1.

A first cell 18 formed substantially in a triangular profile is defined by the front part 3a of the line-shaped joint 3 extending diagonally to the lower back, a front-side portion of the lower part 2b of the line-shaped joint 2 extending in the longitudinal direction, and the front part 2a of the line-shaped joint 2 extending along the A-pillar 31. The triangular first cell 18 communicates with the second gas passage 22 at an opposing corner of the front part 2a of the line-shaped joint of the first cell 18, that is, at a corner between the rear side and the lower side of the first cell 18.

Inside the first cell 18, a line-shaped joint 4 formed substantially in a triangular profile which is similar to and smaller than the figure of the first cell 18 is formed. An inside area 19 defined by the line-shaped joint 4 is a non-inflatable portion into which no gas is introduced. The non-inflatable portion acts to prevent the thickness of the airbag when inflated from being too large. The line-shaped joint 4 extends in a loop starting from a circular joint 10 and returning to the circular joint 10.

Formed between the rear part 3c of the line-shaped joint 3 and a line-shaped joint 6 is a first gas passage 21. The upper portion of the first gas passage 21 faces the aforementioned gas inlet 16 and the lower portion of the first gas passage 21 communicates with the second gas passage 22. The first gas passage 21 extends in the vertical direction at a middle portion in the longitudinal direction of the airbag 1.

A second cell 20a is defined along the front-side of the first gas passage 21. The second cell 20a is formed in a U-like shape between the line-shaped joint 3 and the line-shaped joint 5. In this embodiment, two circular joints 11 and 12 are formed at substantially the same level (height) with of the circular joint 9 in front of the circular joint 9. The line-shaped joint 5 is formed to extend in a U-like shape between the circular joints 11 and 12.

A line-shaped joint 6 is in formed substantially in a C-like shape as a continuation of the lower part 2b of the line-shaped joint 2, extending upwardly at a middle portion in the longitudinal direction of the airbag 1, and being curved rearwardly toward a circular joint 13.

The lower part 2b of the line-shaped joint 2 extends substantially into a Ω-like shape between a middle portion and a rear portion of the airbag 1 and returns to the vicinity of the lower side 1b of the airbag 1. An area 24 defined and surrounded by the lower part 2b of the line-shaped joint 2 in the Ω-like shape is a non-inflatable portion into which no gas is introduced. A cell 23a is formed between this area 24 and the first gas passage 21, a cell 23b is formed between this area 24 and a line-shaped joint 7, and a cell 23c is formed between the line-shaped joint 7 and the rear part 2c of the line-shaped joint 2.

The line-shaped joint 7 branches from a portion near the lower end of the rear part 2c of the line-shaped joint 2 and extends upwardly to reach a circular joint 14.

The circular joints 11, 12, 9, 13, 14 are positioned substantially at the same level (height), thereby forming a narrow gas passage, extending along the upper side 1d of the airbag 1, between these circular joints 11, 12, 9, 13, 14 and the upper part 2d of the line-shaped joint 2.

The airbag 1 is folded by pulling the lower edge thereof up and is disposed along about the roof side rail 32, the A-pillar 31, and the C-pillar 33. In a storage position, the airbag 1 is covered by a suitable cover such as a pillar trim and a roof trim (not shown).

The airbag 1 having the aforementioned structure acts as follows. When the vehicle is involved in a lateral collision or roll-over, the inflator 17 is activated to supply gas into the airbag 1. The gas from the inflator 17 flows through the gas inlet 16 mainly to the first gas passage 21 so as to inflate the middle portion in the longitudinal direction of the airbag 1 downwardly as shown in FIG. 3. Then, the airbag 1 pushes and open a roof trim 36B above a B-pillar 37 and thus starts to deploy into the vehicle cabin.

After the middle portion of the airbag 1 further deploys along the B-pillar from the state shown in FIG. 3, gas flows into the second gas passage 22 so that the lower edge portion of the airbag 1 is also inflated. At the time when the second gas passage 22 starts to be inflated, a portion about the first cell 18 of the airbag 1 is pulled or dragged by already-inflated portions of the airbag 1, i.e. the second gas passage 22 and the area around the second gas passage 22, so as to tear a trim 36A of the A-pillar and come out of the trim 36A. Gas from the second gas passage 22 is introduced into the first cell 18 thus pulled out, thereby inflating the first cell 18.

As described above, according to one embodiment of the present invention, the inflation of the first cell 18 is carried out after the first cell 18 is dragged out of the trim 36A. When the first cell 18 comes out of the A-pillar trim 36A, the first cell 18 is not or scarcely inflated so that the first cell 18 is still small in volume. Accordingly, the frictional resistance applied to the first cell 18 by the A-pillar trim 36A is extremely small so that the first cell 18 can be extremely smoothly dragged out of the trim 36A. In addition, the trim 36A is required to create a smaller slit through which the airbag 1 is pulled out so that the trim 36A has a simple structure.

In this embodiment, the first cell 18 has a triangular profile of which one side extends along the A-pillar 31 and communicates with the second gas passage 22 at an opposing corner of the side along the A-pillar 31. When the second gas passage 22 is inflated, the first cell 18 starts to come out of the trim 36A at the corner side thereof. Therefore, the resistance applied to the first cell 18 by the trim 36A when the first cell 18 is dragged out of the trim 36A is extremely small, thereby allowing smooth deployment of the first cell 18.

When gas flows into the first gas passage 21 so that the middle portion of the airbag 1 is inflated downwardly as shown in FIG. 3, the second cell 20a and the cell 23a adjacent to the first gas passage 21 are also pulled by the inflated first gas passage 21 and is thus dragged out of the trim 36B. Since these cells 20a, 23a are inflated mainly outside the trim 36B, the movement of the airbag 1 pushing and opening the trim 36B to deploy out of the trim 36B is also smooth.

In this embodiment, since the cells 23b and 23c are also pulled by the first gas passage 21 which is already inflated or being inflated, the cells 23b and 23c are dragged out of the trims 36B, 36C into the vehicle cabin before the cells start to be inflated or the cells are inflated a little. The movement of these cells is also smooth.

Though the triangular first cell 18 is provided only in a front portion of the airbag 1 along the A-pillar 31 in the aforementioned embodiment, a triangular first cell may also be provided in a rear portion of the airbag along the C-pillar 33.

Figure 5:
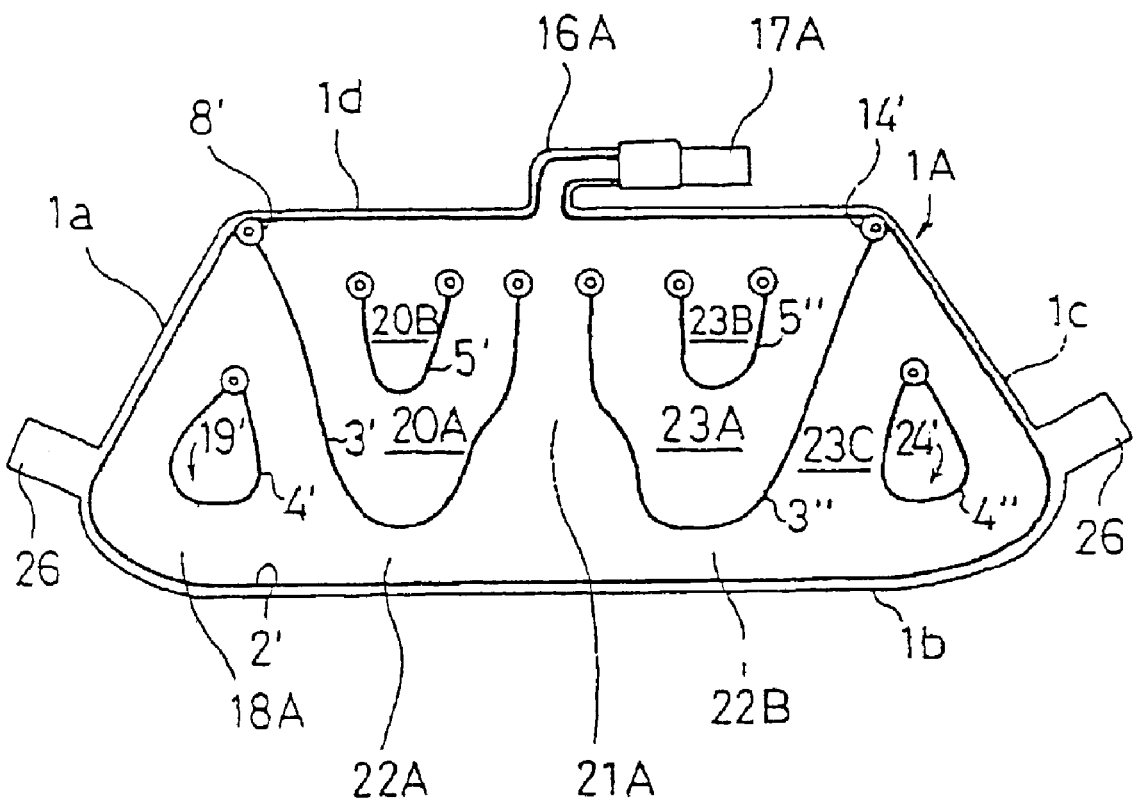
FIG. 5 is a front view, as seen from a vehicle cabin, showing a head protective airbag according another embodiment.
Figure 6:
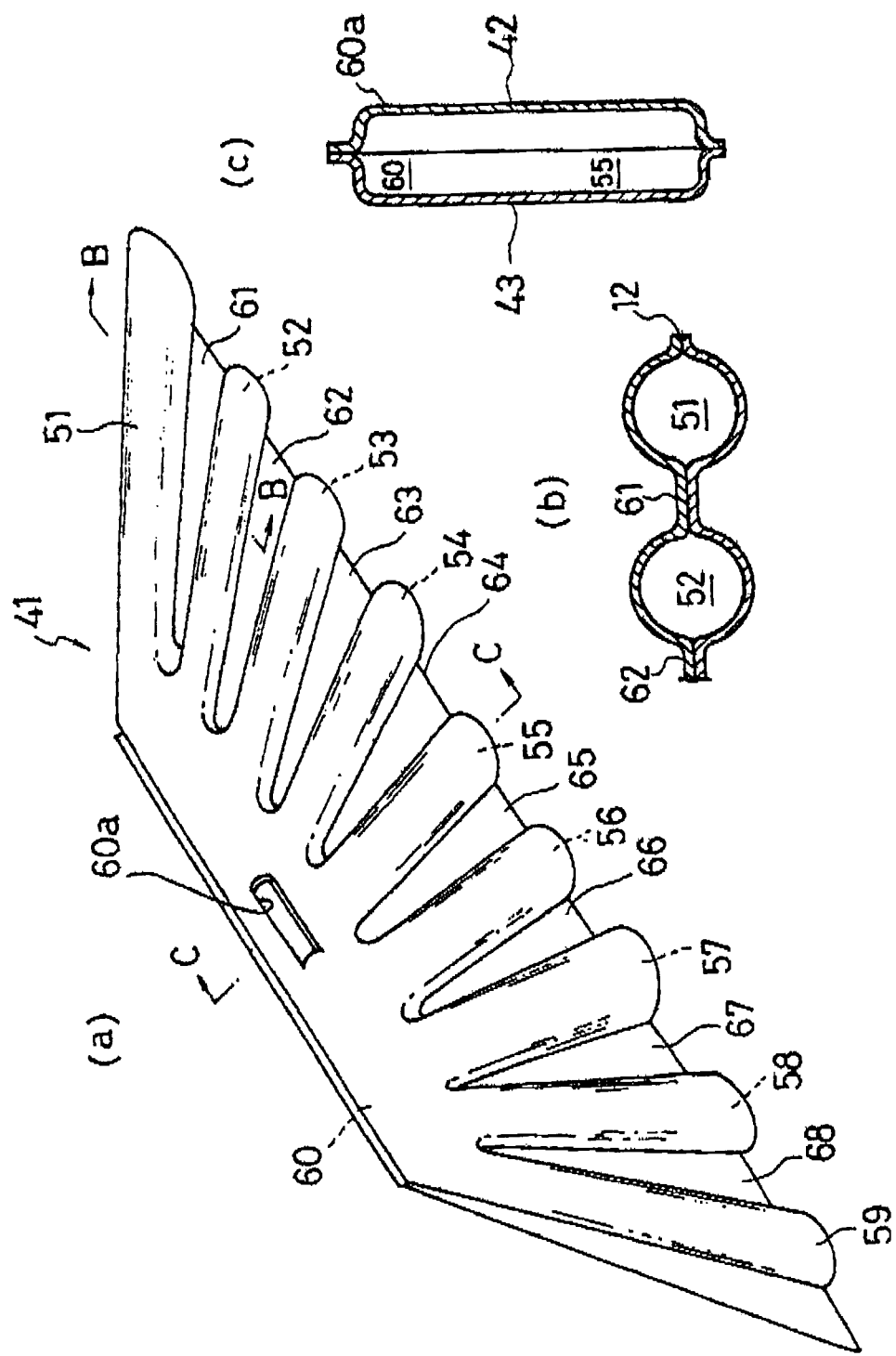
FIGS. 6A–6C are illustrations for explaining a conventional head protective airbag.
Figure 7:
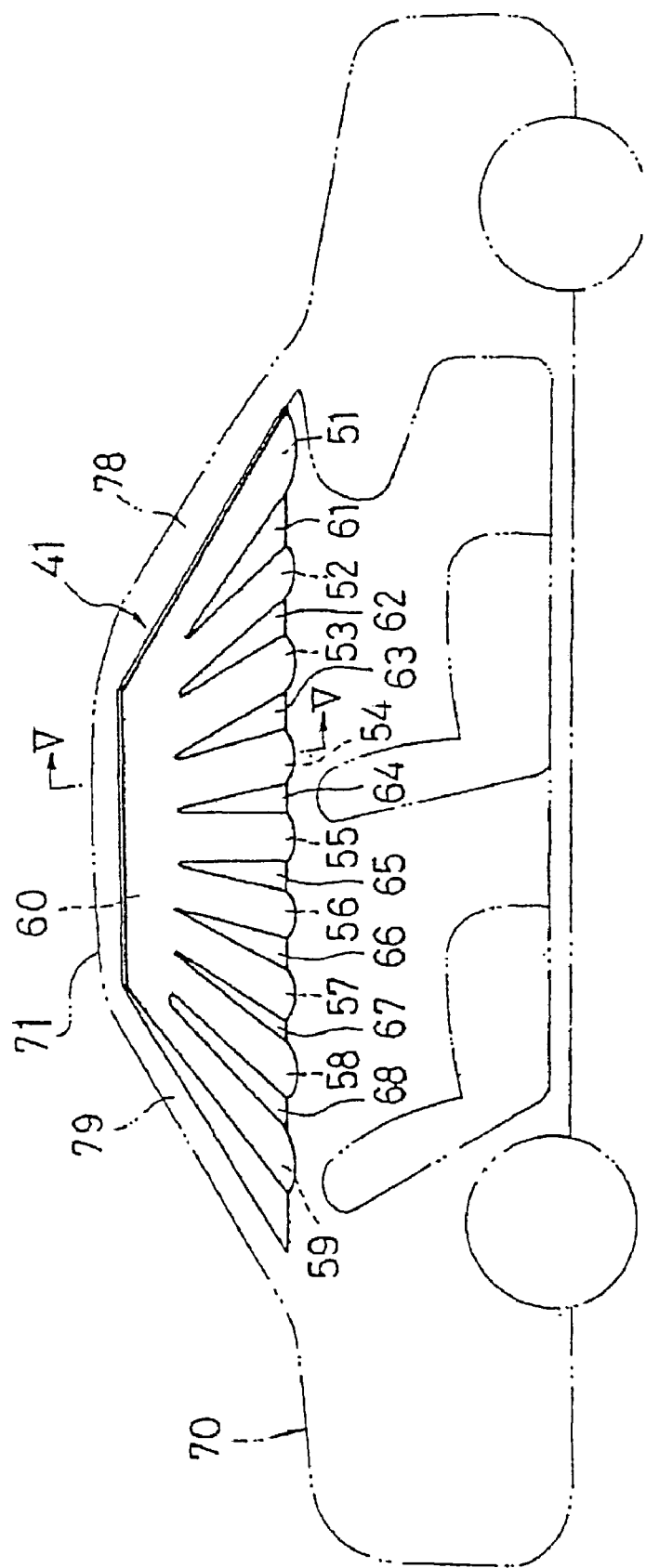
FIG. 7 is an illustration for explaining the conventional head protective airbag.

FIG. 5 shows an airbag 1A according to another embodiment having such a structure. The airbag 1A has triangular cells 18A, 23C formed in a front portion and a rear portion thereof. At the centers of the cells 18A, 23C, triangular non-inflatable areas 19', 24' are formed by line-shaped joints 4', 4", respectively. The cells 18A, 23C are defined by line-shaped joints 3', 3", respectively. The line-shaped joints 3', 3" are connected to circular joints 8', 14' formed at front and rear corners of the upper side of the airbag, respectively. A first gas passage 21A is formed between the liner-shaped joints 3' and 3". Formed between the line-shaped joints 3', 3" and a lower part of a line-shaped joint 2' extending along the periphery of the airbag are second and third gas passages 22A, 22B which communicate with the first gas passage 21A and extend in the longitudinal direction.

The line-shaped joints 3', 3" are formed in U-like shape. Formed inside the U-like line-shaped joints 3', 3" are U-like line-shaped joints 5', 5", respectively. Second cells 20A, 23A are formed between the line-shaped joints 3', 3" and the line-shaped joints 5', 5", respectively.

Further, formed inside the line-shaped joints 5', 5" are cells 20B, 23B. The airbag 1A is connected at a front end and a rear end thereof to the A-pillar and the C-pillar via projections 26.

Also in this embodiment, gas from an inflator 17A introduced through a gas inlet 16A positioned substantially at a middle portion in the longitudinal direction of the airbag and flows into the first gas passage 21A to start the inflation of the airbag 1A and to quickly draw out the first cells 18A, 23C from trims of the A-pillar and the C-pillar. Since the cells 18A, 23C are not or scarcely inflated when pulled out, the cells 18A, 23C can be smoothly pulled out through small slits of the trims.

The above embodiments are both illustrative examples of the present invention and the present invention is not limited to the above embodiments. For example, the profile and location of the second cell may be changed. Even the profile of the first cell is not limited to triangle and may be substantially trapezoid, semi-circle, or square.

Though the line-shaped joint having a shape similar to and smaller than the first cell is provided inside the first cell and the area inside the line-shaped joint is non-inflatable portion in the above embodiments, the shape of the line-shaped joint is not limited to the shape similar to the first cell. Moreover, the non-inflatable portion may be omitted.

Though the circular joints are provided at ends of the line-shaped joints for reinforcing areas around ends of the line-shaped joints defining the first and second cells and the first and second gas passages, the circular joints may be omitted by connecting an end of a line-shaped joint to a midway of another line-shaped joint and by connecting ends of line-shaped joints.

Though the first gas passage is disposed substantially at the middle in the longitudinal direction of the airbag in the above embodiments, the location of the first gas passage is not limited thereto. Further, two first gas passages may be provided to be disposed at difference locations in the longitudinal direction of the airbag. In this case, it is preferable that the airbag is provided along the upper side of the airbag with a gas distributing means such as a duct having gas ports which are in communication with upper parts of the respective first gas passages.

Though the gas inlet is disposed substantially at the middle in the longitudinal direction of the upper side of the airbag in the above embodiments, the location of the gas inlet is not limited thereto. The inflator to be connected to the gas inlet may be located at any place such as the roof side rail or the C-pillar of the vehicle. When the inflator is located in the C-pillar, a duct for introduction of gas may be connected to the inflator in order to introduce gas from the inflator into the first gas passage.

Though the head protective airbag is fabricated by joining two sheets together in the above embodiments, the fabrication of the airbag is not limited thereto. For example, the airbag may be obtained by using a base fabric which is woven originally into an envelope shape by a so-called "hollow weaving" or "jacquard weaving" method. In this case, the first and second cells and the first and second gas passages are formed inside the airbag by woven joints inside and along the periphery of the airbag, instead of joining the opposite surfaces of the airbag by the line-shaped joints to divide the inside of the airbag.

As described above, according to the present invention, a head protective airbag can be smoothly dragged out of interior members such as trims when a gas generator of a head protective airbag device is actuated.

The priority application, Japanese Patent Application No. 2002-076617 filed Mar. 19, 2002 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined a set forth in the following claims.

What is claimed is:

1. A head protective airbag to be disposed to extend along a pillar and a roof side rail of a vehicle, comprising:
    a first cell having a first side extending along the pillar;
    a second cell extending away from the roof side rail; and
    a gas passage positioned to carry gas from a top to a bottom of the airbag for introducing gas only into the first cell;
    wherein the passage is connected to the first cell only at a second side opposite to the first side of the first cell.

2. The head protective airbag of claim 1,
    wherein the gas passage includes a first portion extending substantially vertically from an upper portion to a lower portion of the head protective airbag, and a second portion extending along a lower side of the head protective airbag and connecting the first portion of the gas passage to the first cell.

3. A head protective airbag as claimed in claim 2, wherein the second cell is positioned to extend along the first portion of the gas passage.

4. The head protective airbag of claim 1, wherein the first cell is configured so that when inflated the first cell has a substantially triangular profile; and wherein the gas passage is connected adjacent to a corner of the triangular profile opposite to the first side of the first cell.

5. The head protective airbag of claim 1, further comprising a gas supply means for supplying gas into the head protective airbag.

6. An airbag for the side of a vehicle comprising:
    a plurality of inflatable cells positioned along a longitudinal direction of the vehicle, wherein each of the inflatable cells is configured so that gas is introduced into the cell adjacent only a top or a bottom of the airbag;
    a gas inlet having a first end adapted to be connected to an inflator and a second end fluidly connected to the plurality of inflatable cells, wherein the gas inlet is configured so that gas from the inflator enters the airbag only through the second end of the gas inlet; and
    a first gas passage extending in a vertical direction and located between at least two of the inflatable cells;
    wherein one end of the gas passage is positioned opposite the second end of the gas inlet so that the gas passage inflates downwardly prior to any substantial inflation of any of the plurality of cells.

7. The airbag of claim 6, wherein a second gas passage is fluidly connected to the bottom of the gas passage and extends generally horizontally to supply inflation gas to a first one of the plurality of inflatable cells.

8. The airbag of claim 7, wherein the first one of the plurality of cells is triangular in shape.

9. The airbag of claim 7, wherein the first one of the plurality of cells is positioned to extend along a pillar of the vehicle.

10. The airbag of claim 7, wherein a third gas passage is fluidly connected to the bottom of the first gas passage and extends generally horizontally towards the rear of the vehicle to supply inflation gas to a second one of the plurality of inflatable cells.

11. The airbag of claim 7, wherein a second inflatable cell is positioned rearward from said first inflatable cell and above the second gas passage, wherein gas for inflating the second inflatable cell does not pass through the first gas passage.

12. The airbag of claim 11, wherein the second inflatable cell is located forward of the first gas passage.

13. The airbag of claim 11, further comprising a third inflatable cell positioned rearward from the first gas passage, wherein gas for inflating the third inflatable cell does not pass through the first gas passage.

14. The airbag of claim 6,
wherein the gas passage is located in a midsection of the airbag relative to the longitudinal direction of the vehicle; and
wherein the airbag is configured so that the gas passage inflates prior to the inflatable cells so that as the gas passage inflates, the inflatable cells are pulled out of a storage position prior to inflating.

15. The airbag of claim 14, wherein the gas passage is positioned so that inflation gas for at least one of the inflatable cells must pass through the gas passage.

16. The airbag of claim 15, wherein the gas passage supplies inflation gas to a triangular shaped first inflatable cell located at a forward most part of the airbag.

17. The airbag of claim 14, wherein one end of the gas passage is positioned adjacent a position wherein the airbag is configured to receive inflation gas from an inflator.

* * * * *